(12) United States Patent
Bloss

(10) Patent No.: US 6,285,922 B1
(45) Date of Patent: Sep. 4, 2001

(54) DEVICE FOR CONTROLLING A GAS-AIR MIXTURE FOR A GAS FLAME TREATMENT

(76) Inventor: Fritz Bloss, Sonnenrainweg 4, D-71297, Mönsheim (DE)

( * ) Notice: Subject to any disclaimer, the term of this patent is extended or adjusted under 35 U.S.C. 154(b) by 0 days.

(21) Appl. No.: 09/077,255

(22) PCT Filed: Nov. 13, 1996

(86) PCT No.: PCT/EP96/04959

§ 371 Date: Aug. 3, 1998

§ 102(e) Date: Aug. 3, 1998

(87) PCT Pub. No.: WO97/20175

PCT Pub. Date: Jun. 5, 1997

(30) Foreign Application Priority Data

Nov. 27, 1995 (DE) .............................................. 195 44 179

(51) Int. Cl.[7] .................................................. G05B 21/00
(52) U.S. Cl. ........................................... 700/274; 700/282
(58) Field of Search ................................... 700/274, 282, 700/266

(56) References Cited

U.S. PATENT DOCUMENTS

| | | | |
|---|---|---|---|
| 3,780,528 | * 12/1973 | Brandenburg | 60/39.27 |
| 4,138,725 | * 2/1979 | Ikemoto et al. | 700/274 |
| 4,545,009 | * 10/1985 | Muraki et al. | 700/44 |
| 4,756,688 | * 7/1988 | Hammond et al. | 432/180 |
| 4,761,744 | * 8/1988 | Singh et al. | 700/274 |

FOREIGN PATENT DOCUMENTS

| | | | |
|---|---|---|---|
| 0188763 A2 | * | 7/1986 | (EP) . |
| 0488969 A2 | * | 3/1992 | (EP) . |
| 91/06809 | * | 5/1991 | (WO) . |
| 93/11391 | * | 6/1993 | (WO) . |

* cited by examiner

*Primary Examiner*—Paul P. Gordon
*Assistant Examiner*—Zolla Cabrera

(57) ABSTRACT

Control device of a gas/air mixture regulating system for a gas flame treatment, with at least one burner (12) with an air supply duct (13) which has a valve (21) which can regulate the flow of air, with a gas supply duct (14) which has a valve (41) which can regulate the flow of gas, and with a mixing path (15), leading to the burner (12), of a gas/air mixture, wherein a central computing unit (28) is provided which respectively outputs at least one control variable to a regulator (26) for the control of the valve (21) and to a further regulator (46) for the control of the valve (41); and that the control variables can be compared in the regulators (26, 46) with actual values which are determined by a flow measuring device (22) of the air supply duct (13) and a flow measuring device (42) of a gas supply duct (14); and that the control variables output by the regulators (26, 46) can be adjusted on the closed-loop control systems.

10 Claims, 1 Drawing Sheet

DEVICE FOR CONTROLLING A GAS-AIR MIXTURE FOR A GAS FLAME TREATMENT

Figure 1:
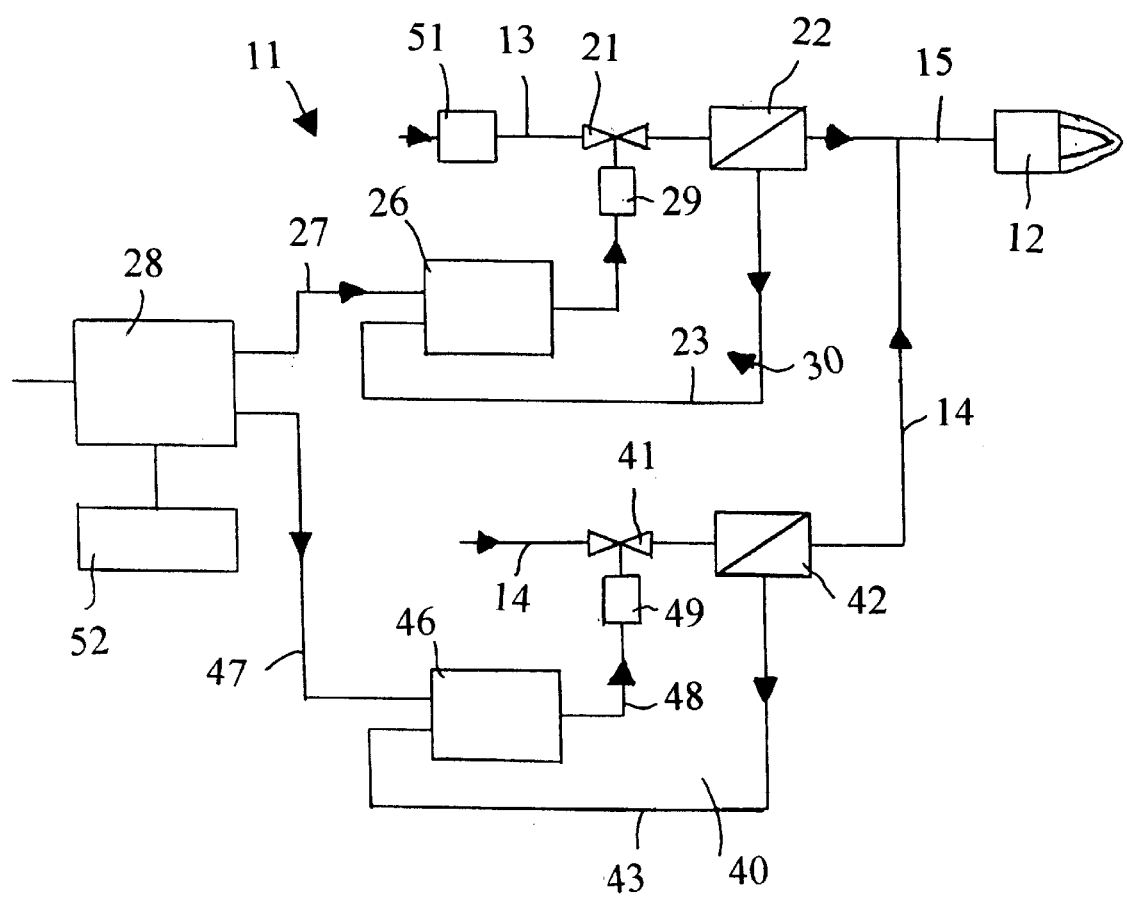

The invention relates to a control device of a gas/air mixture regulating system for a gas flame treatment for the coating of surfaces with at least one burner according to the preamble of claim 1.

In the coating of surfaces, for example the decoration of plastics or the printing or lamination of foils, the materials concerned are mostly nonpolar and—regardless of their other advantages—show no tendency to exhibit adhesion to other materials such as, for example, lacquers, printing inks, adhesives and the like. It is therefore necessary to activate the surfaces to be treated, in order to make possible a sufficient wetting and adhesion of the coating. For this, besides a corona discharge process and a low pressure plasma process, a gas flame process is used.

In such gas flame processes, the surface to be coated is treated with a gas flame produced by a burner. In this pretreatment, it is not only a thermal process which is concerned, in which an improved adhesion is attained by means of a deformation of the surface and the resulting surface enlargement, but also a chemical process is concerned, by means of which an increase in the surface energy can be attained. The surface energy is in general a prerequisite as a measure for a satisfactory adhesion, in which the surface energy of the base material is larger, for example by an amount of 10 mN/m, than the surface tension of the medium to be applied.

It has been shown that a flame having the highest possible temperature and a stable form is obtained with a purely stoichiometric gas/air mixture for a gas flame treatment, but showed no effect as regards improvement of adhesion. A reduction of the proportion of oxygen had the result that the flame became unstable, since the lacking oxygen was replaced with oxygen from the surrounding air. Such a flame thus has a reducing action, which is likewise not advantageous. With an increase of the proportion of oxygen over the stoichiometric amount, the excess oxygen likewise takes part in the reaction at the surface to be treated, so that—after the gas has been combusted without residue—the excess oxygen remains in the combustion product in the form of radicals and various ions, so that an oxidizing flame results.

Surface treatment with a flame whose oxygen content exceeds the stoichiometric amount has the effect that molecular chains of the material to be coated are broken by the action of heat and the oxygen components are bonded to these break points. Polar molecules thus arise in the originally nonpolar material, so that good adhesion to the coating material results. The proportion of the gas/air mixture is an important aspect for the action of the gas flame treatment.

Apparatuses for gas flame treatment have heretofore been disclosed in which the proportion of the gas/air mixture can be determined. However, such apparatuses have the disadvantage that they can only give information on the mixing ratio of oxygen to gas, but not on the output relating to the flow of gas and oxygen, which likewise contributes to the result of the treatment. Furthermore, there are problems in setting the desired output at the burner. An expensive manual setting is therefore necessary, which first requires an equalization of the flow of the gas/air mixture to the output required for the pretreatment, and then a setting to the corresponding mixing ratio between gas and air, where the proportion of oxygen is to exceed the stoichiometric amount, or an additional measurement of the burner output. Such apparatuses cannot be used with automatic production such as preferably provided for example in the automobile industry, in which fenders made of plastic are lacquered in various sizes.

Moreover an apparatus for burner control is also known in the prior art, in which a measurement of the flame temperature is used as a criterion for the setting and regulation of the mixture proportions. This apparatus has the disadvantage, however, that a precise determination of the mixing ratio is not possible. This is because the highest temperature of the flame is obtained with a stoichiometric gas/air mixture. However, a temperature lower than the highest temperature results from setting the required excess of oxygen, and has to be passed to a regulator as a reference value. It then cannot be determined whether the temperature reduction is due to an excess of oxygen or to an excessive proportion of gas, which likewise results in a fall of the flame temperature. Thus a precise determination cannot result, since either an excess of oxygen or else an excessive proportion of gas can be present at the same temperature.

The invention therefore has as its object to provide a control device for a gas flame treatment system such that both the mixing proportion of gas to air and also the output to be delivered at the burner can be set, regulated, and monitored.

This object is attained according to the invention by the characterizing part of claim 1.

By the use of a central computer unit, which determines the flow rates of air and gas in dependence on the mixing proportion of the gas/air mixture which was entered and also in dependence on the output to be delivered by the burner, the central computer unit can output control variables as reference values to a regulator for control of an air quantity regulating valve, and to a regulator for control of a gas quantity valve, so that a required setting of the gas flame for the treatment is given directly after starting up the control device or after the entering of new parameters. The present setting of the regulating valves, and thus the actual flow quantities, can be determined by the simultaneous measurement of the flow quantities of air and gas by means of a flow measuring device, so that on the one hand the precise mixing ratio of gas: air can be determined, and on the other hand the output delivered at the burner can be determined. The measurement data which are determined as regards the flow quantities are passed as reference values to the regulators for control of the regulating valves, so that these can carry out an equalization to the reference values obtained from the central computing unit, in order to be able to set the mixing proportion exactly and to be able to output new control values to the actuators of the regulators. An optimum performance result for the improvement of adhesion can thereby be attained, since the proportion of oxygen exceeding the stoichiometric amount can be set and regulated with certainty.

The embodiment of the control device according to the invention furthermore has the advantage that several standard mixing proportions are stored in the central computer unit, and can easily be called up in dependence on the gas used, for example, natural gas (methane), propane, or butane. Depending on the output to be delivered at the burner, the central computer unit can then output the corresponding control variables to the regulators, so that an optimum gas flame is present at the burner by exact setting of the valves. Furthermore, the required flow quantities can be set to given parameters, such as for example the kind and the surface of the material to be treated, and also the speed of travel with the burner over the surface to be treated. Then, specifically to the application, a quick and simple changeover can be made for the treatment of a new material, as regards the parameters for the treatment, which can also be encapsulated in an automatic process control. It can furthermore be insured that an incorrect setting can be prevented from causing damage to a material to be treated.

This embodiment furthermore makes it possible for a higher operating convenience, which can be adjusted to each application, to be provided by means of a simple entering of the parameters for the material to be treated.

According to an advantageous embodiment of the invention, it is provided that the air and gas quantity regulating valves are respectively followed by a device which measures the flow. The flows of air and gas can thereby be determined exactly, corresponding to the actual proportions, and these actual values can be passed on to the regulators, so that a controlled amount of the gas/air mixture can be supplied to the burner.

According to a further advantageous embodiment of the invention, it is provided that a thermoanemometer which has at least two sensors in one tube is used as the flow measuring device. A flow measurement can then take place, in that the upstream sensor measures the heat of the gas stream or air stream, and the second, subsequent, sensor is heated to a predetermined constant temperature. The quantity of energy to be subsequently supplied in order to keep the second sensor at a constant temperature can then give a measure for the mass or quantity of air/gas flowing through.

An alternative embodiment of a thermoanemometer can be given in that the subsequent sensor is heated with a constant current, and the temperature change can then be measured, again representing a measure for the flow. According to a further advantageous embodiment, an analog regulator which has a proportional-integral characteristic and damping is provided, relating to the time constant from the respective actuator, where these can be optimally adjusted to the regulating system. The damping can be individually adjustable, in order to attain the best possible adjustment time without hunting arising.

Advantageous embodiments and developments of the invention are given in the further claims.

An preferred embodiment example of the invention is shown in the accompanying drawing, and is described in more detail in the following description.

FIG. 1 shows a block diagram of a control device according to the invention, with burner.

FIG. 1 shows a block diagram of a control device 11 of a gas/air regulating system for a gas flame treatment with a burner 12. It will be understood that a multiple burner arrangement can also be attached. A gas/air mixture is supplied to the burner 12 via an air supply duct 13 and a gas supply duct 14, which merge into a common mixing path 15. The required air is provided via a fan 51 from the surroundings; such a fan 51 works in a range up to at most 200 mbar. The gas required for the treatment is provided in gas cylinders or can be supplied by connection to a natural gas line. Propane and butane are provided in the gas cylinders. The control device 11 has an output range of 30:1 with sufficient linearity.

The control device 11 has a feedback control system 30 for the exact supply of the air.

An air quantity regulating valve 21 is arranged in the air supply duct 13 upstream of the fan 14, and its opening and closing position is motor-driven. The air quantity regulating valve 21 is followed by a flow measuring device 22 by means of which the amount of air supplied to the burner 12 is determined. The flow measuring device 22, which can be constructed as a thermoanemometer, outputs the sensed actual value via a signal line 23 to a regulator 26, which furthermore obtains a preset reference value via a signal line 27 from a central computer unit 28 and compares it with the supplied actual value. The regulator 26 then controls an actuator 29 of the air quantity regulating valve 21 via a control line 28, in dependence on the deviations of the actual value from the reference value, in order to open or close the valve setting in correspondence with the deviation from the reference value.

A structure analogous to that of the feedback control system 30 is given by a feedback control system 40 for the gas to be supplied. A gas quantity valve 41 is provided in the supply duct 14. A flow measuring device 42 is located upstream, and has a signal line 43 to the regulator 46. This receives, via a signal line 47 from the central computer unit 28, corresponding reference values which are supplied in dependence on the actual values as new control variables via the signal line 48 to the actuator 49, and correspondingly change the opening and closing position of the gas quantity valve 41.

The central computer unit 28 is connected to an input field 52 on which there are provided, for example, one or more operating elements for the setting of the amount of air and the amount of gas are provided. Operating elements can furthermore be provided, with which different settings are possible for output, data output, and data input. For example, the selection of predetermined gas/air mixture proportions can be called up; standard settings for an air/natural gas mixture of 11:1, an air/propane mixture of 25:1, and an air/butane mixture of 33:1 can be provided. Furthermore, such a predetermined mixture proportion can be corrected upward or downward. In addition, the input field 52 makes possible a manual input of the output delivered at the burner. It can be specified in the central computer unit 28 that at a given output of the burner 12 a given flow in liters per minute of air and gas must be supplied in order to establish the necessary excess of oxygen in the gas/air mixture. These values are then delivered as reference values to the regulators 26, 46 via the signal lines 27, 47. The data which are at present set can furthermore be shown on a display on the input field 52, so that visual monitoring is also possible. The input field 52 can furthermore have an interface through which the stored process data can be interrogated and printed out, or by means of which external reference values can be transferred. In addition, the central computer unit, via such an interface or a further interface, can be brought into line by a central process monitoring system with the corresponding process step of an automatic production system.

Thus a programmable control device can be provided which can be used as a single appliance in an automatic production system. This control device has a high degree of operating convenience for each individual application and is ready for operation immediately after switching on. Moreover a system is provided which is free from maintenance.

What is claimed is:

1. A gas flame treatment apparatus for a gas flame pretreatment of plastic surfaces by increasing the surface energy of the surfaces to be treated with a control device for regulation of a gas/air mixture comprising:

at least one burner (12), an air supply duct (13) having a valve (21) that regulates a flow of air, a gas supply duct (14) having a valve (41) that regulates a flow of gas, a flow measuring device (22) for said air duct, a flow measuring device (42) for said gas duct, a mixing path (15) of a gas/air mixture leading to said burner (12), a regulator (26) for control of said air regulating valve (21), a regulator (46) for control of said gas regulating valve (41), a central computing unit (28) that, in dependence on reference values for said gas/air mixture and on a reference value for output of said burner (12), outputs at least one control variable to said air regulating valve and said gas regulation valve, said control variables being compared in said air regulator and said gas regulator (26, 46) with actual values determined by said flow measuring device (22) for said air supply duct (13) and said flow measuring device (42) for said gas supply duct (14), said control variables output by said regulators (26, 46) being adjustable on closed-loop control systems formed by said regulating valves, said flow measuring devices and said regulators, said flow measuring devices (22, 42) comprising thermoanemometers separated from said at least one burner (12), and a gas/air mixture with a pressure of less than 200 mbar being supplied to said burner (12).

2. The gas flame treatment apparatus according to claim 1, wherein said thermoanemometer comprises a first sensor, with which heat of a gas stream can be sensed, and a heatable second sensor, the amount of energy that is supplied for a constant temperature of said second sensor being a measure of air flow and gas flow.

3. The gas flame treatment apparatus according to claim 1, further comprising actuators (29, 49) for regulating said valves (21, 41), respectively.

4. The gas flame treatment apparatus according to claim 1, comprising a display of an input device on which present values of burner output and a mixing proportion of gas and air by said central computer unit (28) are represented.

5. The gas flame treatment apparatus according to claim 1, wherein an output range of said control device has a setting range of up to about 30:1.

6. The gas flame treatment apparatus according to claim 1, further comprising a source of compressed air for supply of air.

7. The gas flame treatment apparatus according to claim 1, further comprising an air supply fan (51) for sucking surrounding air into said air duct (13).

8. The gas flame treatment apparatus according to claim 1, comprising a source of natural gas for supplying said gas.

9. The gas flame treatment apparatus according to claim 1, further comprising containers of propane or butane for supplying said gas.

10. The gas flame treatment apparatus according to claim 1, wherein said at least one burner comprises a multiple burner arrangements further comprising several branch ducts that branch from said mixing path (15) for supplying said gas/air mixture.

* * * * *